UNITED STATES PATENT OFFICE.

FREDERICK M. RUSCHHAUPT, OF NEW YORK, AND GUSTAVUS BURHENNE, OF WILLIAMSBURG, N. Y.

IMPROVEMENT IN BREWING ALE, PORTER, &c.

Specification forming part of Letters Patent No. 81,214, dated August 18, 1868.

*To all whom it may concern:*

Be it known that we, FREDERICK M. RUSCHHAUPT, of the city, county, and State of New York, and GUSTAVUS BURHENNE, of the city of Williamsburg, county of Kings, and State of New York, have invented a certain new and useful Improvement in Brewing of Lager-Beer, Ale, and other kinds of beer; and we do hereby declare that the following is a full, clear, and exact description thereof.

The nature of our invention consists in the production of lager-beer, ale, and other kinds of beer which not only possesses the required refreshing and stimulating properties, but which also can be manufactured at much less expense, as hitherto has been done, and which is at the same time much richer in such substances as albumen, phosphates, &c., which are known as being so essential for the organism.

The ordinary way of preparing beer may be briefly defined as to steep or to mash the prepared malt with a certain amount of water, at a temperature at which the starch will be converted into dextrine and sugar by the diastase of the malt; thence boiling the thus-obtained sweet-wort in suitable coppers with an addition of hops, whereafter the same is cooled and forwarded into the tuns or vats, in order to be subjected to the process of fermentation, after which it is finally put into casks for immediate or for a future use.

There is no second operation in the art of brewing which is so differently and frequently modified in its execution as the process of mashing, or the preparation of the wort, which, however, explains itself by its particular importance for the whole process of brewing. The two leading points in conducting the same are for the purpose to prevent a loss of the useful constituent of the grain and to produce a wort of such quality that a most refreshing, wholesome, and nourishing beverage may result from it. However the whole process has been arranged and conducted, the object in view has as yet not been attained, which fact, and the true reason for it, may be found fully demonstrated in any modern handbook on chemical technology, as also in the different publications of late on beer. (See Mulder's "Chemistry of the Beer," chapter 16, bearing the title, "Loss of Nourishing Constituents in Brewing.") We therefore do not find it necessary to go here into any explanation about it.

Experience has also fully taught us that those kinds of beer which have as yet been brewed are by far not the very beverages of which the people are desirous of. Yet the comparatively high prices of malt are a strong obstacle for the brewer to use a higher percentage of it, and their commonly insufficient knowledge explains us the reason why as yet no material improvements in producing the required effect have been made by them in brewing, and wherever experiments have been made for that purpose there have been difficulties experienced which they could not overcome.

To avoid such difficulties is the object of our invention, which consists in the application of well-prepared Indian-corn meal, bran of wheat, bran of oats, or bran of rye; of different phosphates, as phosphate of potassa or soda, phosphate of magnesia, and particularly of glycerine-phosphate of lime.

The low price of the Indian-corn meal and the abundance of it in market renders it most suitable to serve as a substitute for at least a certain part of malt in brewing. The peculiar physical condition of its particles, however, consisting in horn-like integuments surrounding the starch-globules, makes it necessary that it be treated previously by means of hot water or by steam, at a temperature of about 190° Fahrenheit, or about 70° Reaumur, before it is to be mixed with the malt to be, by the diastatic power of the same, converted into dextrine and sugar.

The small quantity of albuminous bodies and of salts, so essential for a nourishing beverage, makes it also indispensable to use other suitable materials or substances in combination with it, in order to make up those deficiencies. For this the bran of wheat (or bran of oats or rye) serve partially, with the most promising success. They contain an abundance of pure and mostly-soluble vegetable albumen, and from fifteen to twenty per cent. of starch, which can be easily converted into dextrine and sugar, representing thus alone a most profitable material for brewing beer. Its great bulk of husk also causes the Indian meal, in admixture with the malt, to remain suspended in the mash, facilitating thus most essentially the converting of the same into saccharine substances. In order, also, to make up the amount of salts, of which the phosphates are of particular importance, which, remaining in the grains, are lost for the human organism, and to compensate the deficiency of the same caused by the use of Indian meal, we add, after the mashing is accomplished, or at the end of this process, a suitable amount of phosphates, consisting in phosphate of potassa or of soda, and of phosphate of magnesia, to the mash, and after the wort has been boiled and cooled, a certain amount of glycerine-phosphate of lime to the wort.

The importance of those phosphates in beverages, as lager-beer, ale, &c., cannot be overrated. The quantity of them in our different kinds of beer, small as it is, is nevertheless of the greatest importance for the organism. It is therefore easily understood that not alone no pains should be saved to prevent a loss of those most wholesome and nourishing salts, but also to incorporate into those beverages a certain surplus over the amount which they naturally contain, in such a form and condition that they may be easily assimilated. The glycerine-phosphate of lime is a combination of the utmost importance for the human life. The glycerine-phosphoric acid which it contains forms an essential part of the yellow of eggs, of our brain, nerves, &c., and the phosphoric acid and the lime of it are the very substance of which the greater mass of our bones consists. The salt is soluble in cold water, and in liquids containing a small quantity of alcohol, as wine. It can, therefore, be incorporated in the beer, and thus forwarded as a most useful substance into the human system.

To enable others skilled in the art to make and use our invention, we will now proceed to describe the *modus operandi*, with reference to that already explained in this specification.

We take for a brewing of about ten barrels of lager-beer about seventeen bushels of good malt, (barley,) two hundred pounds of meal of kiln-dried Indian corn, two bushels of bran of wheat and two bushels of bran of oats, (or for the one or the other bran of rye,) forty ounces of phosphate of potassa or of soda, two and a half ounces of phosphate of magnesia, and finally about twenty ounces of glycerine-phosphate of lime.

The phosphates of potassa and magnesia may be had at almost any wholesale drug-store for but a trifle, and the glycerine-phosphate of lime also may be had, but perhaps sometimes by giving a previous order, the preparation of which may be read in any text-book on organic chemistry, so that we need not to describe it here. The Indian-corn meal must, before it is brought into the mashing-tun, be treated by some hot water, or with steam and water, at a temperature of about 190° Fahrenheit, or of 70° Reaumur, in order to destroy or to divide its granulary bodies, and to bring it in a proper and finely-divided state into the mashing-tun, where it afterward will be quickly converted by the diastatic power of the malt into dextrine and sugar. The mashing may now be done by means of the process of decoction, (dickmaische, in German,) or of infusion, just as it is practiced already. Those materials allow the same modification in the process of mashing as if malt alone was used.

There will also be no alteration in using or placing up the utensils, although we will remark that by mashing with steam a still better result will be attained than by mashing by means of hot water, as commonly is used.

Having now fully described our invention, we wish it distinctly understood that we do not claim the use of Indian corn for the preparation of beer, as may have been done before; neither do we claim the use of coarsely-ground barley or corn, nor the use of medicines, as has been done by Leopold Huff and others.

We claim—

The use of bran of wheat, bran of oats, or bran of rye, together with meal of kiln-dried Indian corn, and with a certain amount of malt, either alone or with the addition of the herein-named and specified phosphates, for the purpose set forth and herein fully specified.

FREDERICK M. RUSCHHAUPT.
GUSTAVUS BURHENNE.

Witnesses:
WM. GELLMANN,
L. KRALL.